United States Patent
Irie

(10) Patent No.: US 10,036,872 B2
(45) Date of Patent: Jul. 31, 2018

(54) CAMERA APPARATUS, CAMERA BODY, INTERCHANGEABLE LENS, AND METHOD OF CONTROLLING OPERATION OF CAMERA BODY

(71) Applicant: FUJIFILM Corporation, Tokyo (JP)

(72) Inventor: Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/433,096

(22) Filed: Feb. 15, 2017

(65) Prior Publication Data

US 2017/0160515 A1    Jun. 8, 2017

Related U.S. Application Data

(60) Division of application No. 14/754,135, filed on Jun. 29, 2015, now Pat. No. 9,606,422, which is a
(Continued)

(30) Foreign Application Priority Data

Mar. 19, 2013   (JP) ................. 2013-055852

(51) Int. Cl.
*G03B 17/00* (2006.01)
*G02B 7/14* (2006.01)
(Continued)

(52) U.S. Cl.
CPC ............. *G02B 7/14* (2013.01); *G02B 7/04* (2013.01); *G02B 7/09* (2013.01); *H04N 5/2254* (2013.01)

(58) Field of Classification Search
CPC ................................ G03B 17/00
(Continued)

(56) References Cited

U.S. PATENT DOCUMENTS

2007/0133970 A1   6/2007 Honjo et al.
2007/0280679 A1   12/2007 Kato
(Continued)

FOREIGN PATENT DOCUMENTS

JP   2-296207 A   12/1990
JP   11-15035 A   1/1999
(Continued)

OTHER PUBLICATIONS

International Preliminary Report on Patentability issued in PCT/JP2013/083836, dated Jan. 8, 2015.
(Continued)

*Primary Examiner* — Clayton E Laballe
*Assistant Examiner* — Fang-Chi Chang
(74) *Attorney, Agent, or Firm* — Birch, Stewart, Kolasch & Birch, LLP

(57) ABSTRACT

The invention speeds up operation of an interchangeable lens. The interchangeable lens, which is removably mounted on a camera body, includes a communication control microcomputer, a lens driving circuit and a lens driving actuator. A body-side microcomputer and the communication control microcomputer of the interchangeable lens are connected and are capable of communicating with each other. Lines are provided in such a manner that the lens driving circuit and body-side microcomputer can communicate directly. A command from the body-side microcomputer is input to the lens driving circuit. This allows the lens driving circuit to be controlled directly and makes it possible to control the interchangeable lens at high speed.

1 Claim, 16 Drawing Sheets

Related U.S. Application Data continuation of application No. PCT/JP2013/083836, filed on Dec. 18, 2013.

(51) Int. Cl.
*G02B 7/09* (2006.01)
*G02B 7/04* (2006.01)
*H04N 5/225* (2006.01)

(58) Field of Classification Search
USPC .......................................................... 396/532
See application file for complete search history.

(56) References Cited

U.S. PATENT DOCUMENTS

2009/0060486 A1   3/2009   Higuma
2011/0229115 A1   9/2011   Okada

FOREIGN PATENT DOCUMENTS

| JP | 2005-292659 A | 10/2005 |
|----|---------------|---------|
| JP | 2009-53523 A  | 3/2009  |
| JP | 2012-154967 A | 8/2012  |

OTHER PUBLICATIONS

International Search Report issued in PCT/JP2013/083836, dated Jan. 28, 2014.

Written Opinion of the International Searching Authority issued in PCT/JP2013/083836, dated Jan. 28, 2014.

Notice of Allowance and Notice of Allowability, dated Dec. 5, 2016, in U.S. Appl. No. 14/754,135.

Office Action, dated Aug. 3, 2016, in U.S. Appl. No. 14/754,135.

Restriction Requirement, dated Jun. 21, 2016, in U.S. Appl. No. 14/754,135.

*Fig. 5*

| P11 | P12 | MOTOR DRIVE |
|-----|-----|-------------|
| L | L | STOPPED |
| L | H | STOPPED |
| H | L | REVERSE ROTATION |
| H | H | FORWARD ROTATION |

CAMERA APPARATUS, CAMERA BODY, INTERCHANGEABLE LENS, AND METHOD OF CONTROLLING OPERATION OF CAMERA BODY

CROSS-REFERENCE TO RELATED APPLICATIONS

This application is a Divisional of U.S. patent application Ser. No. 14/754,135, filed Jun. 29, 2015, which is a Continuation of PCT International Application No. PCT/JP2013/083836, filed on Dec. 18, 2013, which claims priority under 35 U.S.C. § 119(a) to Japanese Patent Application No. 2013-055852, filed Mar. 19, 2013. Each of the above applications is hereby expressly incorporated by reference, in its entirety, into the present application.

BACKGROUND OF THE INVENTION

Field of the Invention

This invention relates to a camera apparatus, a camera body, an interchangeable lens and a method of controlling operation of a camera body.

Description of the Related Art

When a removable interchangeable lens is mounted on a camera body, the operation of the interchangeable lens in a case where it is a genuine interchangeable lens for the camera body can be controlled solely by communication between the camera body and the interchangeable lens (namely by a fully electronic mount mechanism) without the provision of a mechanical power transmission mechanism between the camera body and the interchangeable lens. Further, there is a technique whereby an interchangeable lens for another camera is mounted on the camera body of a nonreflex-type camera.

Further, there is a system in which the class of a camera on which a lens has been mounted is discriminated on the lens side, response data is converted in accordance with the camera class and the converted data is sent back to the camera (Patent Document 1), and there is a camera having two communication modes, in which a mounted interchangeable lens performs communication in the supported communication mode (Patent Document 2).

Patent Document 1: Japanese Patent Application Laid-Open No. 2009-53523
Patent Document 2: Japanese Patent Application Laid-Open No. 2012-154967

In a case where an interchangeable lens for another camera is mounted on a camera body, the communication specifications for the camera body will be different from those for the interchangeable lens. Even if the camera body is capable of high-speed communication, therefore, unless the interchangeable lens can communicate at high speed, communication speed will be slow in comparison with an interchangeable lens capable of high-speed communication.

SUMMARY OF THE INVENTION

An object of the present invention is to so arrange it that an interchangeable lens can be controlled at high speed.

A first aspect of the present invention relates to a camera apparatus comprising a camera body and an interchangeable lens removably mounted on the camera body.

The camera body includes: a camera body communication control unit; a camera body communication terminal electrically connected to a communication terminal, which has been formed on the interchangeable lens, by mounting the interchangeable lens; and a camera body signal line connected between the camera body communication control unit and the camera body communication terminal.

The interchangeable lens includes: an interchangeable lens communication control unit; a lens driving circuit for driving a lens driving motor; an interchangeable lens communication terminal electrically connected to the camera body communication terminal of the camera body by mounting the interchangeable lens on the camera body; an interchangeable lens data communication line connected between the interchangeable lens communication control unit and the interchangeable lens communication terminal; and an interchangeable lens driving signal line connected between the lens driving circuit and the interchangeable lens communication terminal.

The camera body communication control unit outputs a data communication command, which is for performing data communication with the interchangeable lens, in response to an interchangeable lens communication command, and outputs an interchangeable lens driving signal in response to an interchangeable lens driving command.

In accordance with the first aspect of the present invention, a camera body is formed to have a camera body signal line between a camera body communication control unit and a camera body communication terminal. The interchangeable lens is formed to have an interchangeable lens data communication line between an interchangeable lens communication control unit and an interchangeable lens communication terminal, and an interchangeable lens driving signal line between a lens driving circuit and the interchangeable lens communication terminal.

When the interchangeable lens is mounted on the camera body, the camera body communication terminal and the interchangeable lens communication terminal are electrically connected. As a result, a data communication command that is output from the camera body communication control unit is applied to the interchangeable lens communication control unit, and a driving signal that is output from the camera body communication control unit is applied directly to the lens driving circuit of the interchangeable lens. Since the lens driving circuit of the interchangeable lens can be controlled directly by the camera body, the interchangeable lens can be controlled at high speed.

The camera body signal line may include: a camera body data communication line, which is connected between the camera body communication control unit and the camera body communication terminal, for performing data communication with the interchangeable lens; and a camera body driving signal line, which is connected between the camera body communication control unit and the camera body communication terminal, for sending a driving signal that drives the interchangeable lens. In this case, the camera body communication control unit would send the camera body data communication line the data communication command, which is for performing data communication with the interchangeable lens, in response to an interchangeable lens communication command, and would send the camera body driving signal line the interchangeable lens driving signal in response to the interchangeable lens driving command.

In a case where the camera body communication terminal, camera body data communication line, camera body driving signal line, interchangeable lens communication terminal, interchangeable lens data communication line and interchangeable lens driving signal line are each provided in plural so as to correspond, the camera body communication control unit would output to the camera body driving signal line a driving force control signal for driving the lens driving motor and a driving direction control signal for controlling lens driving direction of the lens driving motor.

By way of example, the camera body communication control unit outputs to the camera body driving signal line the driving force control signal for driving the lens driving motor, the driving direction control signal for controlling lens driving direction of the lens driving motor, and driving speed of the lens driving motor.

By way of example, the camera body communication control unit inputs data, which represents position information of the lens driving motor, via the camera body driving signal line, the data being output from the lens driving circuit of the interchangeable lens.

By way of example, the interchangeable lens further includes a switching command memory for storing a switching command which switches between control of the lens driving circuit by the camera body communication control unit and control of the lens driving circuit by the interchangeable lens communication control unit. In this case, the camera body would further include: a switching command reading unit for reading the switching command that has been stored in the switching command memory; and a switching command transmitting unit for transmitting the switching command, which has been read by the switching command reading unit, to the interchangeable lens communication control unit.

By way of example, the interchangeable lens communication control unit, on the basis of the switching command transmitted from the switching command transmitting unit of the camera body, switches between control of the lens driving circuit by the camera body communication control unit and control of the lens driving circuit by the interchangeable lens communication control unit.

By way of example, the camera body communication control unit transmits an inquiry command inquiring about status of the interchangeable lens, and outputs the interchangeable lens driving signal in accordance with receipt of data, which indicates the status of the interchangeable lens, sent from the interchangeable lens in response to the inquiry command.

Preferably, the switching command is such that lens position will be unchanged before and after driving of the lens driving motor in a case where the lens driving motor has been driven based upon the switching command.

The switching command may be one having a frequency recognizable by the lens driving circuit.

A second aspect of the present invention is a camera body constituting a camera apparatus. Further provided is a method of controlling operation of this camera body. A third aspect of the present invention is an interchangeable lens constituting a camera apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 illustrates the relationship between port outputs and motor drive.

DESCRIPTION OF THE PREFERRED EMBODIMENTS

Figure 1:
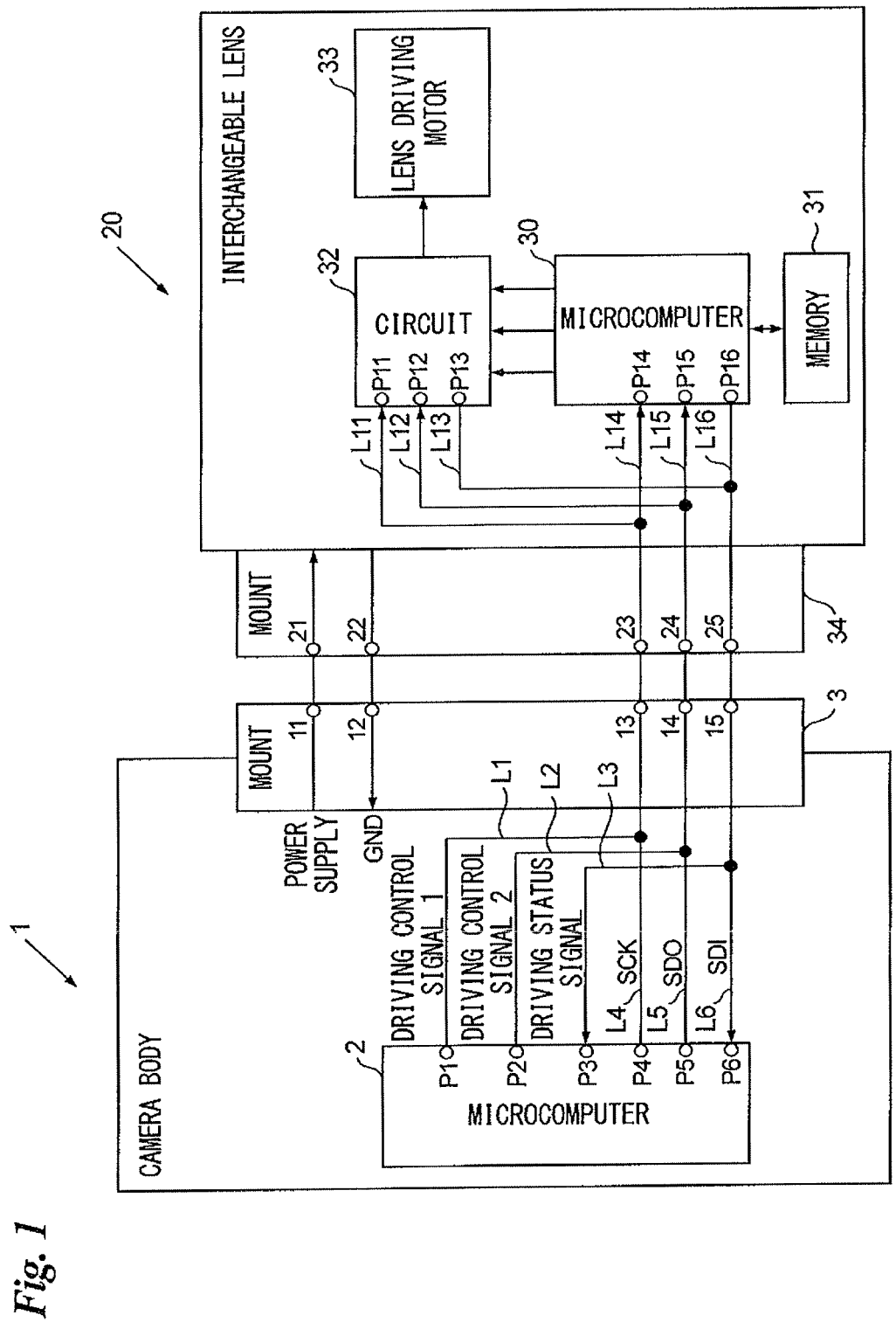
FIGS. 1 to 3 are block diagrams illustrating the electrical configuration of a camera apparatus.

FIG. 1, which illustrates an embodiment of the present invention, is a block diagram showing part of the electrical configuration of a camera apparatus.

The camera apparatus includes a camera body 1 and an interchangeable lens 20.

The camera body 1 includes a body-side microcomputer (camera communication control unit) 2 for controlling overall operation of the camera body 1. Further, the camera body 1 is formed to have a mount 3 for mounting the interchangeable lens 20. The mount 3 is formed to have terminals 11 to 15.

The body-side microcomputer 2 is formed to have ports P1 to P6. The ports P1, P2 and P3 are connected to terminals (camera body communication terminals) 13, 14 and 15, which are formed on the mount 3, via camera body driving signal lines L1, L2 and L3, respectively. The ports P4, P5 and P6 are connected to the terminals 13, 14 and 15, which are formed on the mount 3, via camera body data communication lines L4, L5 and L6, respectively.

The terminals 11 and 12 of the mount 3 are connected to a power supply and to ground, respectively.

The interchangeable lens 20 includes a communication control microcomputer (interchangeable lens communication control unit) 30 for controlling overall operation. A memory 31 for storing prescribed data and the like is connected to the communication control microcomputer 30. The communication control microcomputer 30 is formed to have ports P14, P15 and P16.

The interchangeable lens 20 further includes a lens driving motor 33 for controlling lens position, and a lens driving circuit 32 for controlling the lens driving motor 33. The lens driving circuit 32 is formed to have ports P11, P12 and P13.

The interchangeable lens 20 is formed to have a mount 34. The mount 34 is formed to have terminals 21 to 25.

The ports P11, P12 and P13 formed on the lens driving circuit 32 are connected to terminals (interchangeable lens communication terminals) 23, 24 and 25, which are formed on the mount 34, via interchangeable lens driving signal lines L11, L12 and L13, respectively. Further, the ports P14, P15 and P16 formed on the communication control microcomputer 30 are connected to the terminals 23, 24 and 25, which are formed on the mount 34, via interchangeable lens data communication lines L14, L15 and L16, respectively.

When the interchangeable lens 20 is mounted on the camera body 1, the terminals 11, 12, 13, 14 and 15 formed on the mount 3 of the camera body 1 and the terminals 21, 22, 23, 24 and 25 formed on the mount 34 of the interchangeable lens 20 are electrically connected, respectively.

When this is done, the ports P1, P2 and P3 formed on the body-side microcomputer 2 of the camera body 1 and the ports P11, P12 and P13 formed on the lens driving circuit 32 of the interchangeable lens 20 are electrically connected, respectively. Further, the ports P4, P5 and P6 formed on the body-side microcomputer 2 of the camera body 1 and the ports P14, P15 and P16 formed on the communication control microcomputer 30 of the interchangeable lens 20 are electrically connected, respectively.

As a result of mounting the interchangeable lens 20 on the camera body 1, driving control signals for controlling the lens driving motor 33 can be applied directly to the lens driving circuit 32 from the ports P1 and P2 of the body-side microcomputer 2 of the camera body 1. Further, a signal output from the lens driving circuit 32 and representing the driving status of the lens driving motor 33 can be input directly to the body-side microcomputer 2 via the port P3 thereof. Furthermore, a serial clock pulse (SCK) and serial data can be sent from the ports P4 and P5 of the body-side microcomputer 2 to the communication control microcomputer 30, and serial data can be sent from the port P16 of communication control microcomputer 30 to the port P6 of the body-side microcomputer 2.

By using the body-side microcomputer 2 of the camera body 1, the lens driving circuit 32 of the interchangeable lens 20 can be controlled without the intermediary of the communication control microcomputer 30.

Figure 2:
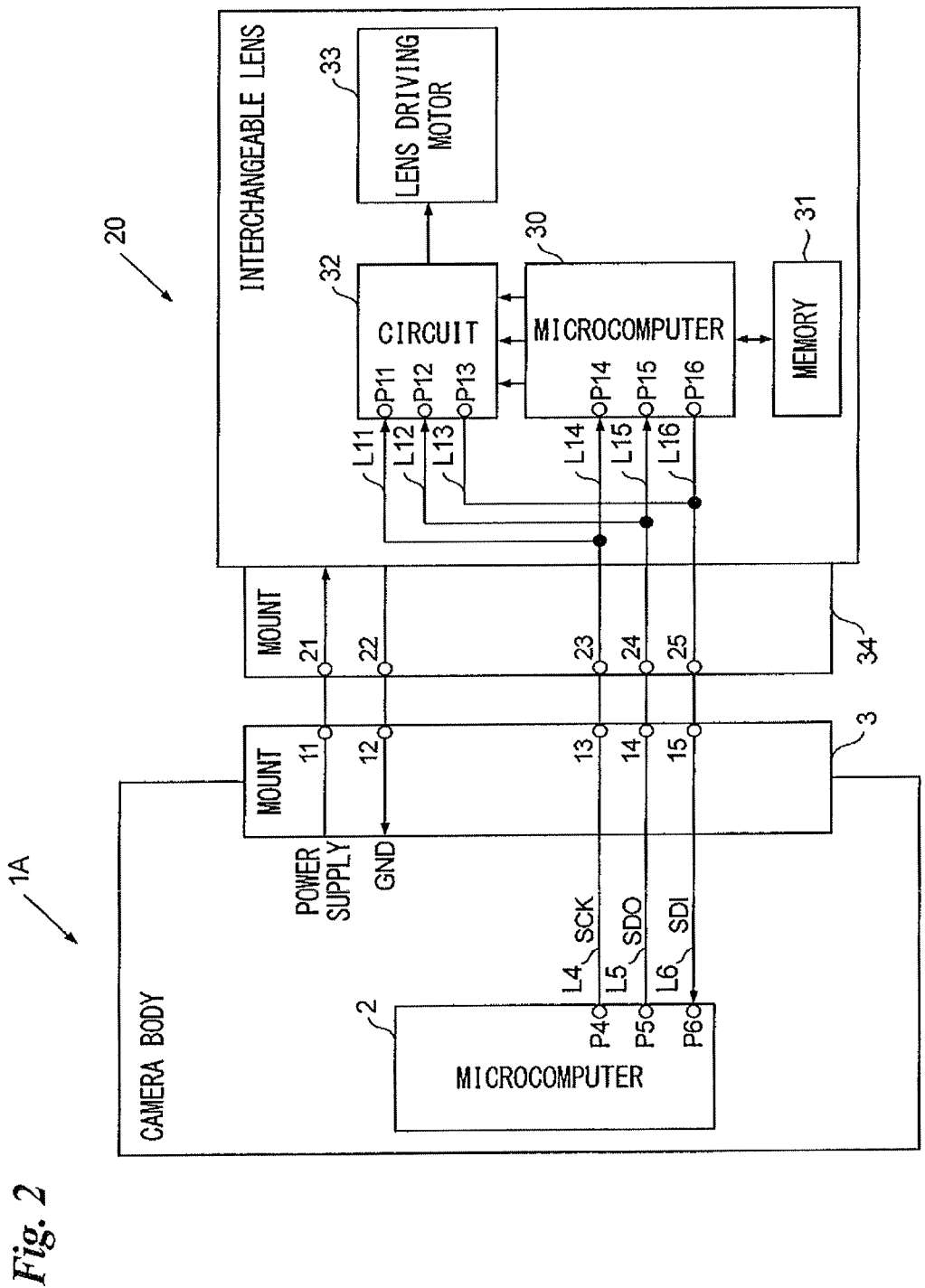

FIG. 2, which corresponds to FIG. 1, is a block diagram illustrating the electrical configuration of a camera apparatus. Components in FIG. 2 identical with those shown in FIG. 1 are designated by like reference characters and need not be described again.

Camera apparatus 1A shown in FIG. 2 is not formed to include the lines L1, L2 and L3 between the ports P1, P2 and P3 of the body-side microcomputer 2 and the terminals 13, 14 and 15 of the mount 3, but is formed to have data communication lines (camera body signal lines) L4, L5 and L6 connecting the body-side microcomputer 2 and the terminals 13, 14 and 15, respectively. Thus, even though the lines L1, L2 and L3 are not formed, the lens driving circuit 32 can be controlled directly by the body-side microcomputer 2 utilizing the data communication lines L4, L5 and L6.

Figure 3:
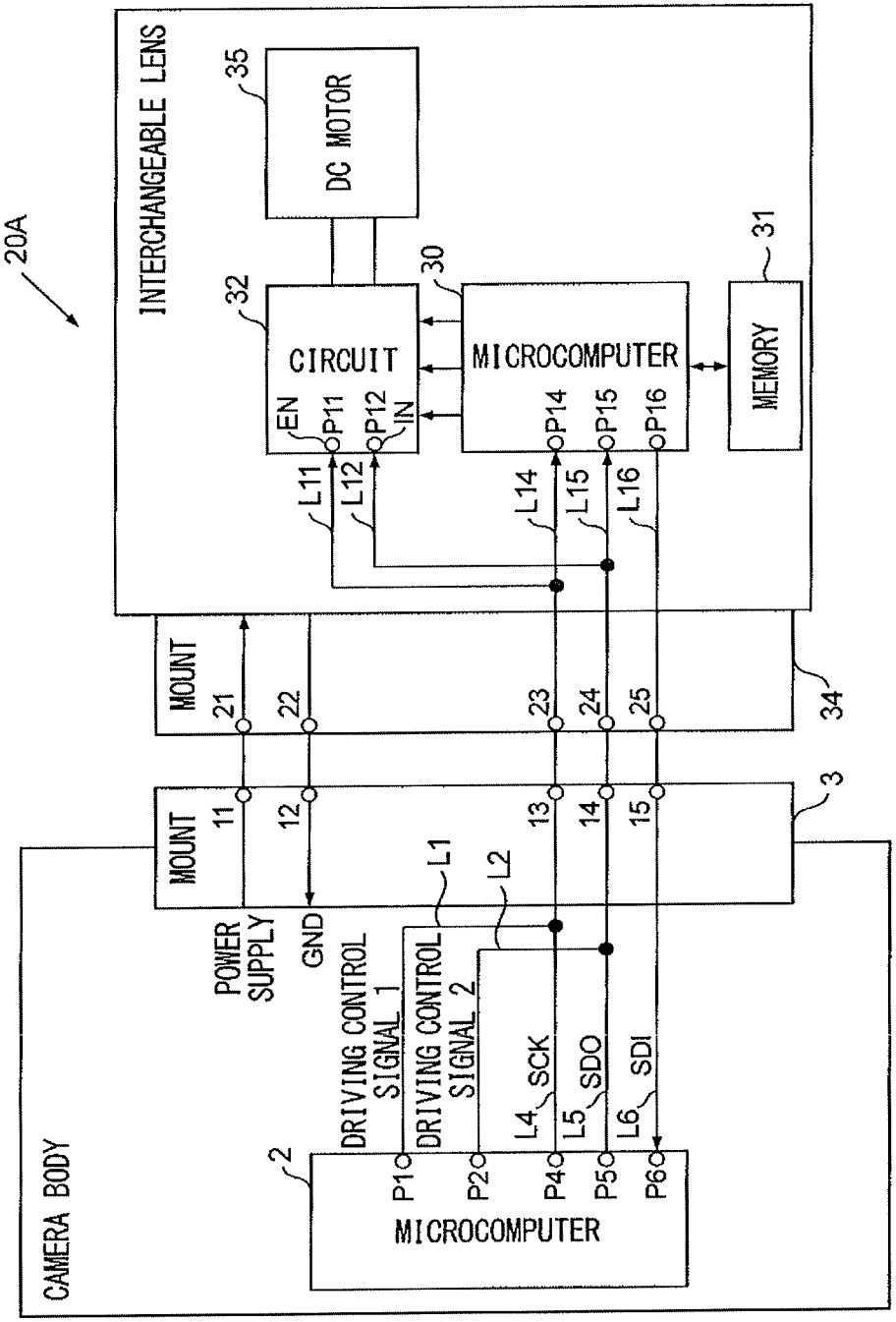

FIG. 3, which corresponds to FIG. 1, is a block diagram illustrating the electrical configuration of a camera apparatus. Components in FIG. 3 identical with those shown in FIG. 1 are designated by like reference characters and need not be described again.

An interchangeable lens 20A includes the lens driving circuit 32. The latter controls a DC motor 35.

Camera body 1B does not have the line L3, and the interchangeable lens 20A does not have the line L13.

In FIG. 3, the lines L1 and L2 within the camera body 1 need not necessarily be provided.

Figure 4:
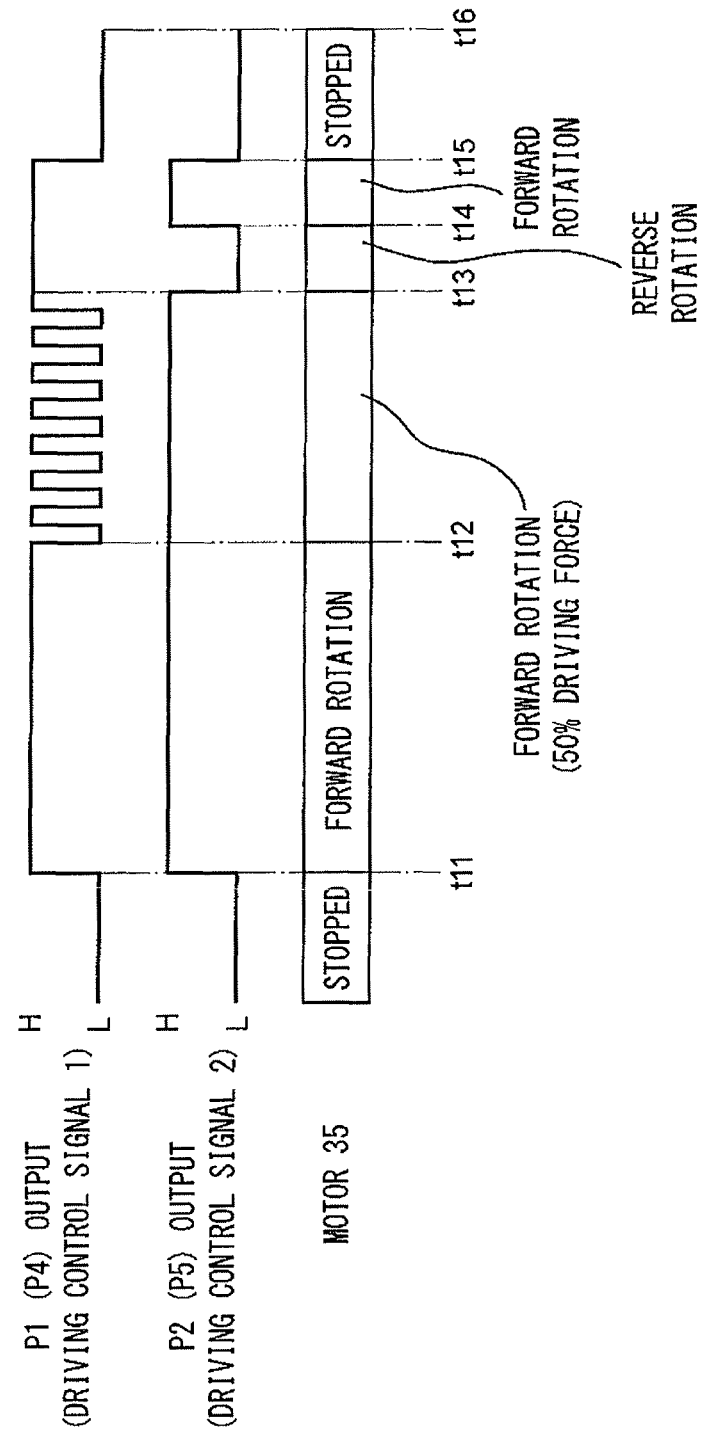
FIG. 4 is a time chart of a camera apparatus.

FIG. 4 illustrates the driving signals that are output from the body-side microcomputer 2 and the state of drive of the DC motor 35.

A first driving control signal is output from the port P1 (which may just as well be the port P4) of the body-side microcomputer 2 and is input to port P11 of the lens driving circuit 32. Further, a second driving control signal is output from the port P2 (which may just as well be port P5) of the body-side microcomputer 2 and is input to the port 12 of the lens driving circuit 32.

FIG. 5 illustrates the relationship between the signals input to ports P11 and P12 of the lens driving circuit 32 and the state of drive of the DC motor 35.

The signal input to the port P11 controls the rotation and stopping of the DC motor 35. The DC motor 35 is stopped when the signal falls to the L level and is rotated when the signal attains the H level. The signal input to the port P12 controls the direction of rotation of the DC motor 35. The DC motor 35 is rotated in the forward direction when the signal attains the H level and in the reverse direction when the signal falls to the L level.

With reference again to FIG. 4, the first driving control signal that is input to the port P11 is at the L level and the DC motor 35 is at rest until time t11. When time t11 arrives, the first driving control signal attains the H level and the second driving control signal that is input to the port P12 also attains the H level, as a result of which the DC motor 35 is driven into rotation. When time t12 arrives, the first driving control signal starts alternating between the H and L levels and the second driving control signal attains the H level. The DC motor 35, therefore, is rotated in the forward direction at a driving force of 50%. When time t13 arrives, the first driving control signal is at the H level but the second driving control signal falls to the L level, as a result of which the DC motor 35 is rotated in the reverse direction. When time t14 arrives, the second driving control signal attains the H level and therefore the DC motor 35 is rotated in the forward direction. When time t15 arrives, the first driving control signal falls to the L level and therefore the DC motor 35 is stopped.

Figure 6:
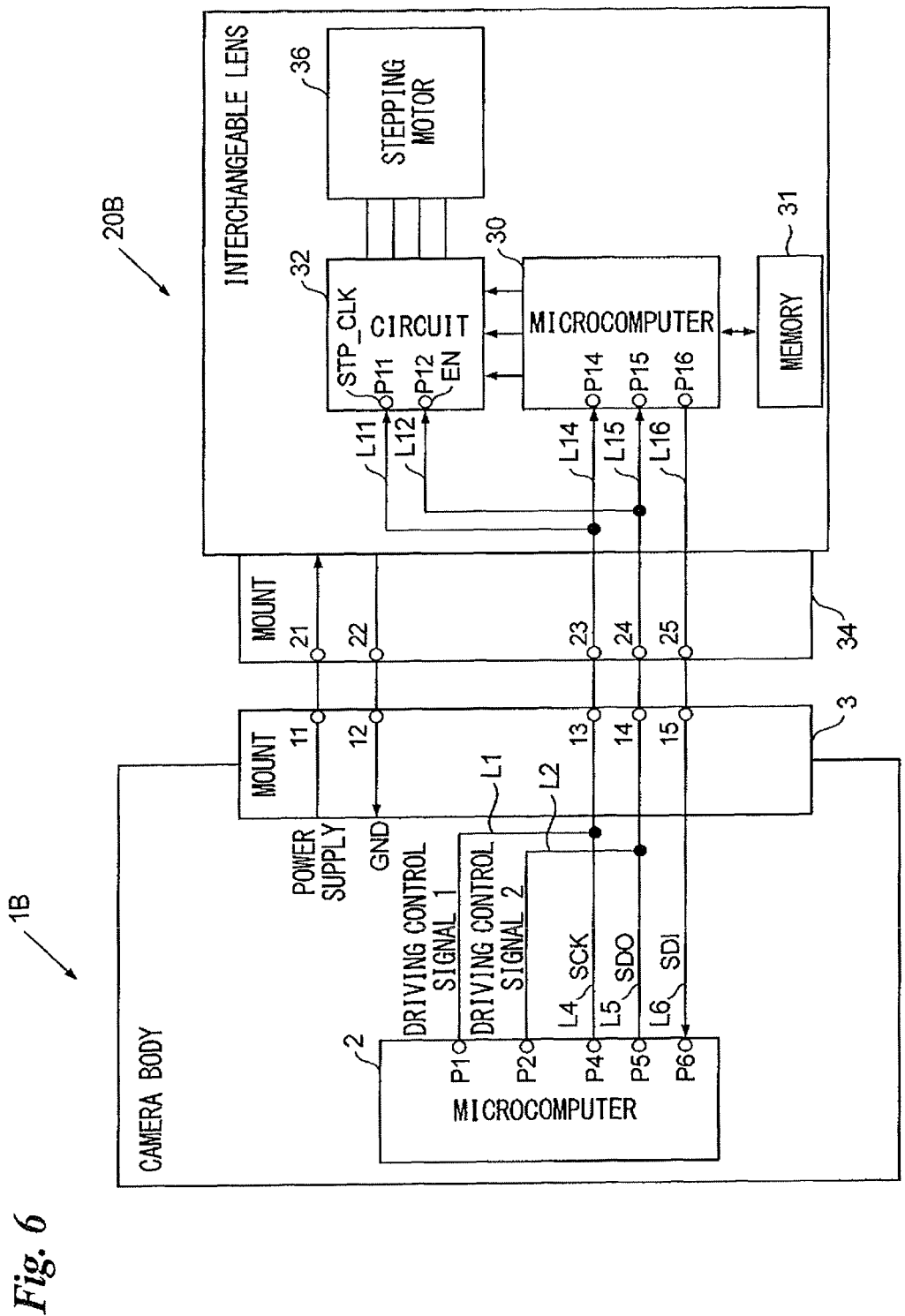
FIG. 6 is a block diagram illustrating the electrical configuration of a camera apparatus.

FIG. 6, which illustrates another embodiment of the present invention, is a block diagram showing the electrical configuration of a camera apparatus. Components in FIG. 6 identical with those shown in FIG. 3 are designated by like reference characters and need not be described again.

An interchangeable lens 20B includes a stepping motor 36 controlled by the lens driving circuit 32. The rotation and speed of the stepping motor 36 are controlled by inputting step pulses, which serve as the first driving control signal, to port P11 of the lens driving circuit 32. The direction of rotation of the stepping motor 36 is controlled by inputting the second driving control signal to the port P12.

The body-side microcomputer 2 shown in FIG. 6 need not necessarily be provided with the lines L1 and L2.

Figure 7:
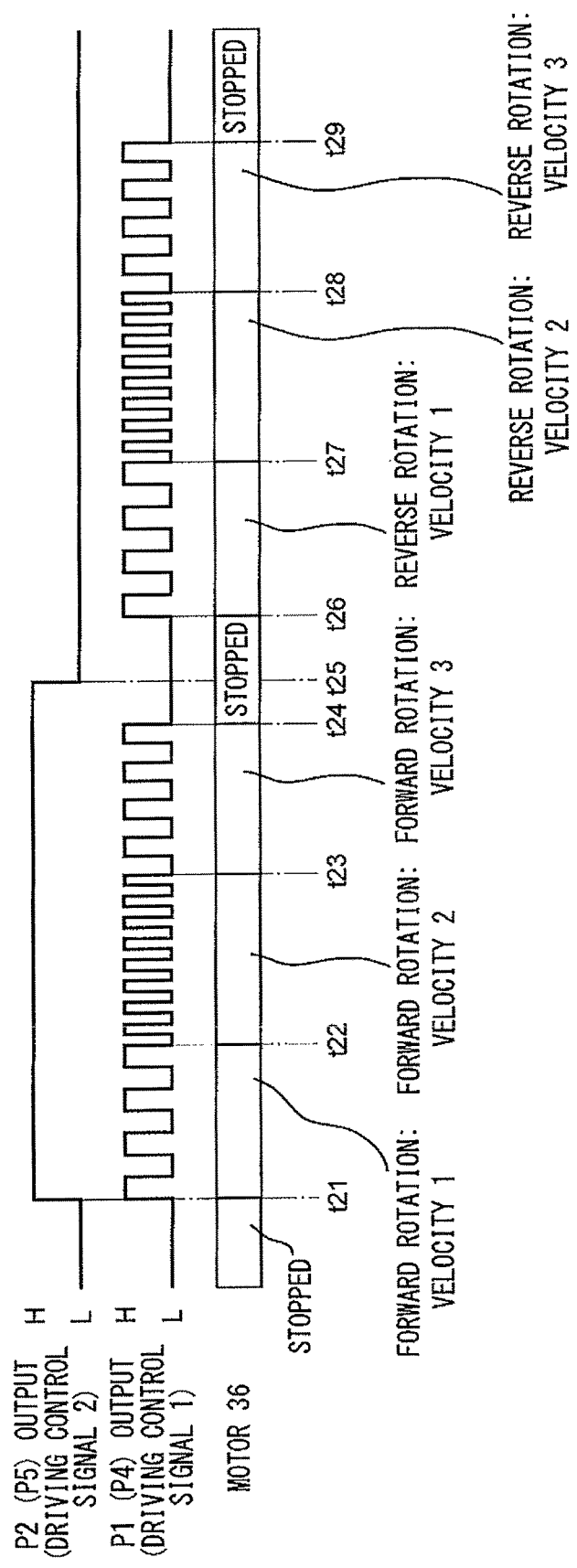
FIG. 7 is a time chart of a camera apparatus.

FIG. 7 illustrates the first driving control signal that is output from the port P1 (or port P3) of the body-side microcomputer 2, the second driving control signal that is output from the port P2 (or port P4) of the body-side microcomputer 2, and the status of the stepping motor 36.

If the first driving control signal that is input to the port P11 of the lens driving circuit 32 is at the H level, the stepping motor 36 will rotate in the forward direction. Conversely, if the first driving control signal is at the L level, the stepping motor 36 will rotate in the reverse direction. Since the first driving control signal is at the H level from time t21 to time 25, the stepping motor 36 will rotate in the forward direction when it runs. Since the first driving control signal is at the L level from time t25 onward, the stepping motor 36 rotates in the reverse direction when it runs.

The speed of rotation of the stepping motor 36 changes in accordance with the period of the second driving control signal that is input to port P12 of the lens driving circuit 32. The interval from time t21 to time t22 is a first period, the interval from time t22 to time t23 is a second period, and the interval from time t23 to time t24 is a third period. The speed of the stepping motor 36 varies in accordance with these periods.

Figure 8:
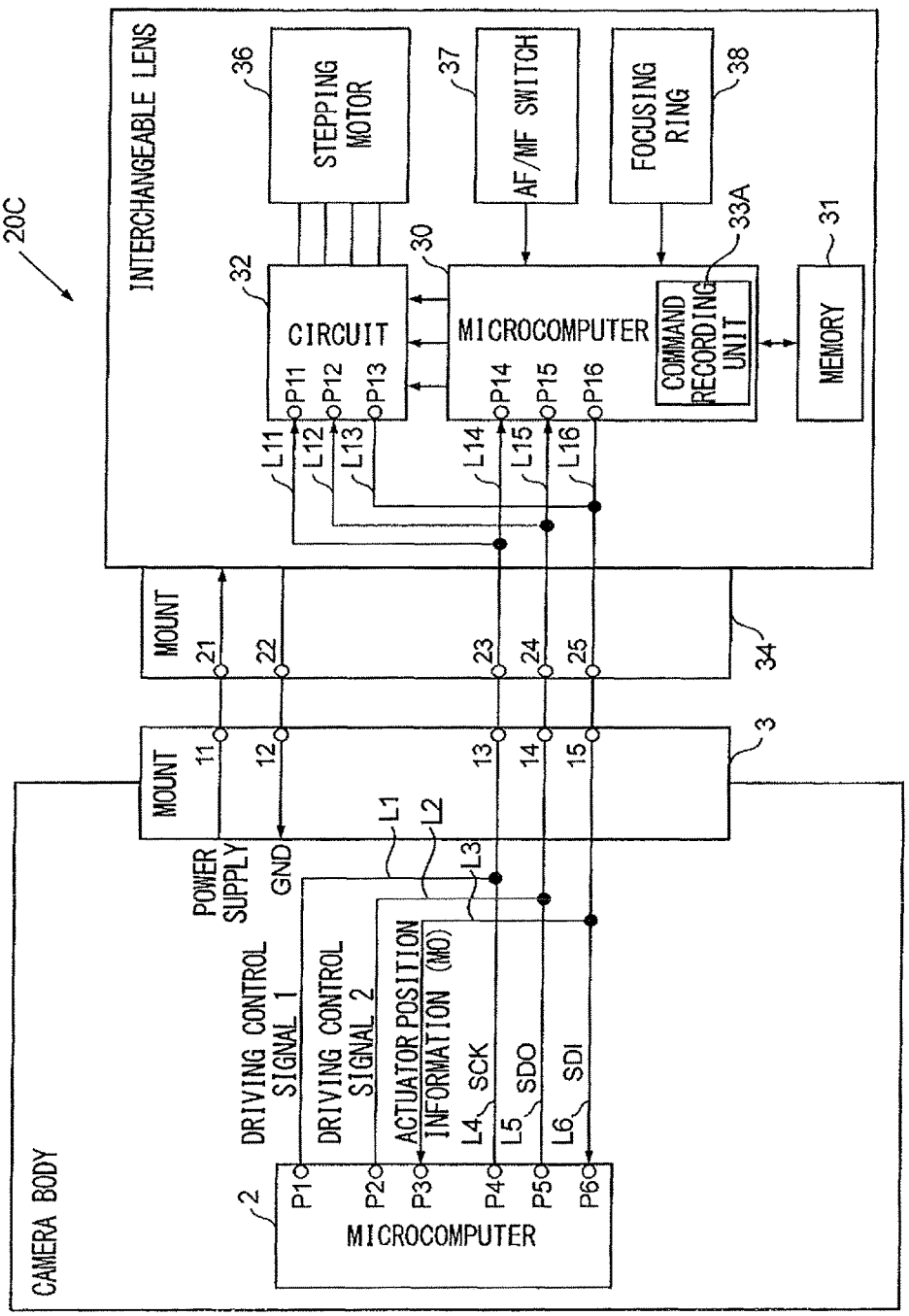
FIG. 8 is a block diagram illustrating the electrical configuration of a camera apparatus.

FIG. 8, which illustrates another embodiment of the present invention, is a block diagram showing the electrical configuration of a camera apparatus. Components in FIG. 8 identical with those shown in FIG. 6 are designated by like reference characters and need not be described again.

In a manner identical with that of the example shown in FIG. 6, driving control signals are output from the ports P1 and P2 of the body-side microcomputer 2 of a camera body 1C. Information indicative of the position of the stepping motor (actuator) is input to the port P3 of the body-side microcomputer 2 of the camera body 1C. It should be noted that an example of the input position information is the number of pulses that drive the stepping motor (actuator).

The communication control microcomputer 30 of an interchangeable lens 20C is provided with a command recording unit 33A. A command for controlling the interchangeable lens 20C in a manner described in detail later has been recorded in the command recording unit 33A (command memory). Further, the interchangeable lens 20C is provided with an AF/MF switch 37, which switches between autofocus and manual focus, and with a focusing ring 38. Signals from the switch 37 and focusing ring 38 are input to the communication control microcomputer 30.

Figure 9:
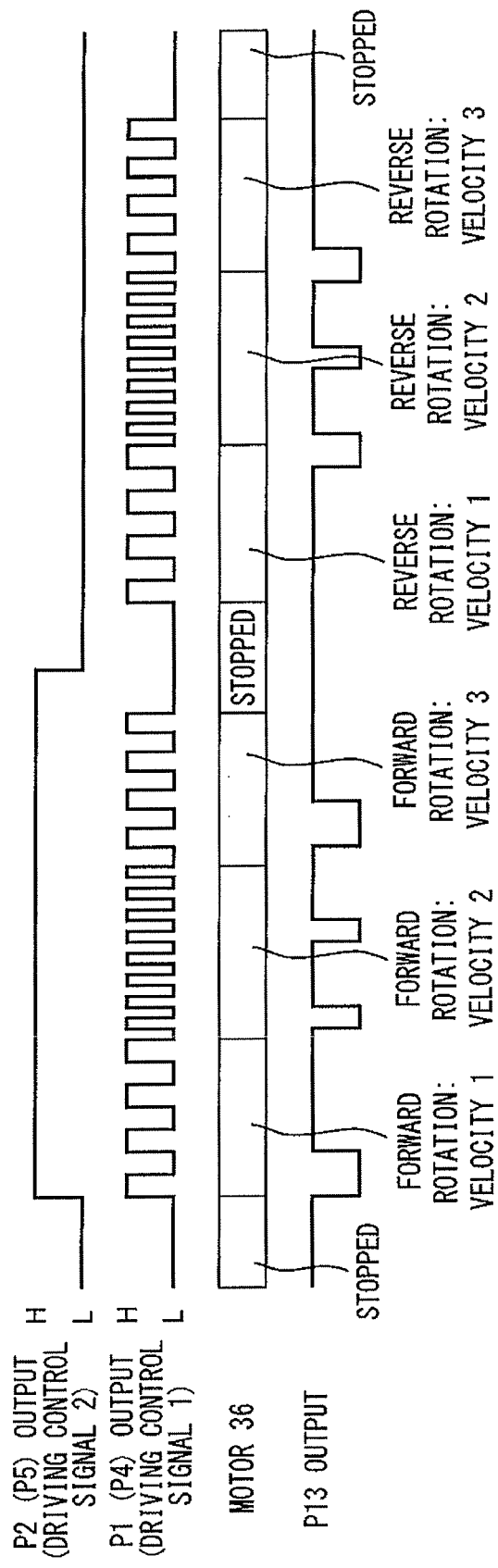
FIG. 9 is a time chart of a camera apparatus.

FIG. 9 shows a position information signal, which indicates actuator position information that is output from the lens driving circuit 32, in addition to the first driving control signal, second driving control signal and status of the stepping motor 36 shown in FIG. 7.

When the rotational position of the DC motor 35 reaches a prescribed position, a pulse indicating that the motor is at this position is output. This pulse is input to the body-side microcomputer 2 as the position information signal. The body-side microcomputer 2 detects the level of the position information signal, whereby the position (rotational angle) of the stepping motor 36 is ascertained. Since the rotational angle of the stepping motor 36 can be ascertained, so can the lens position.

Figure 10:
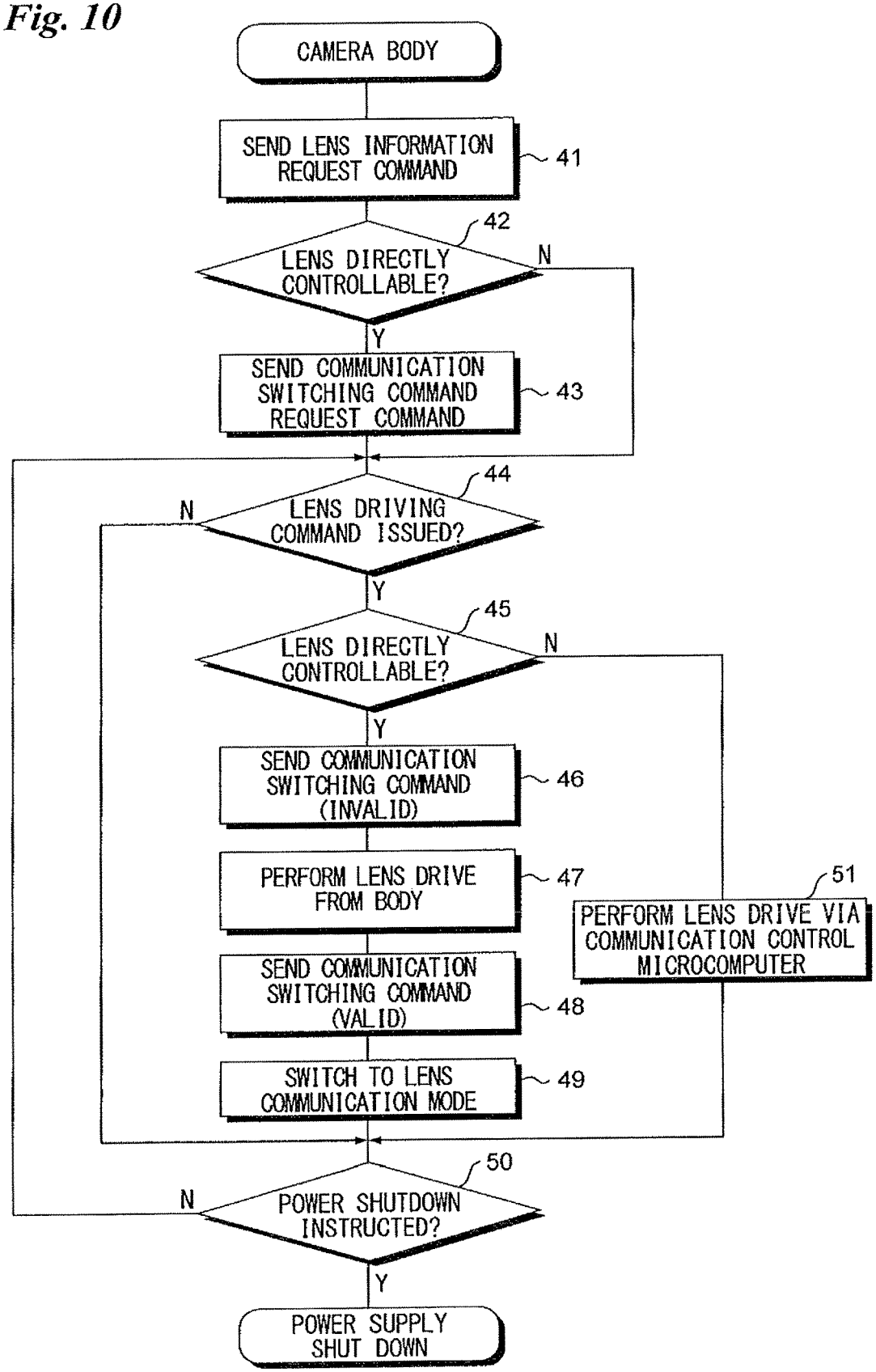
FIG. 10 is a flowchart illustrating processing executed by a camera body.
Figure 11:
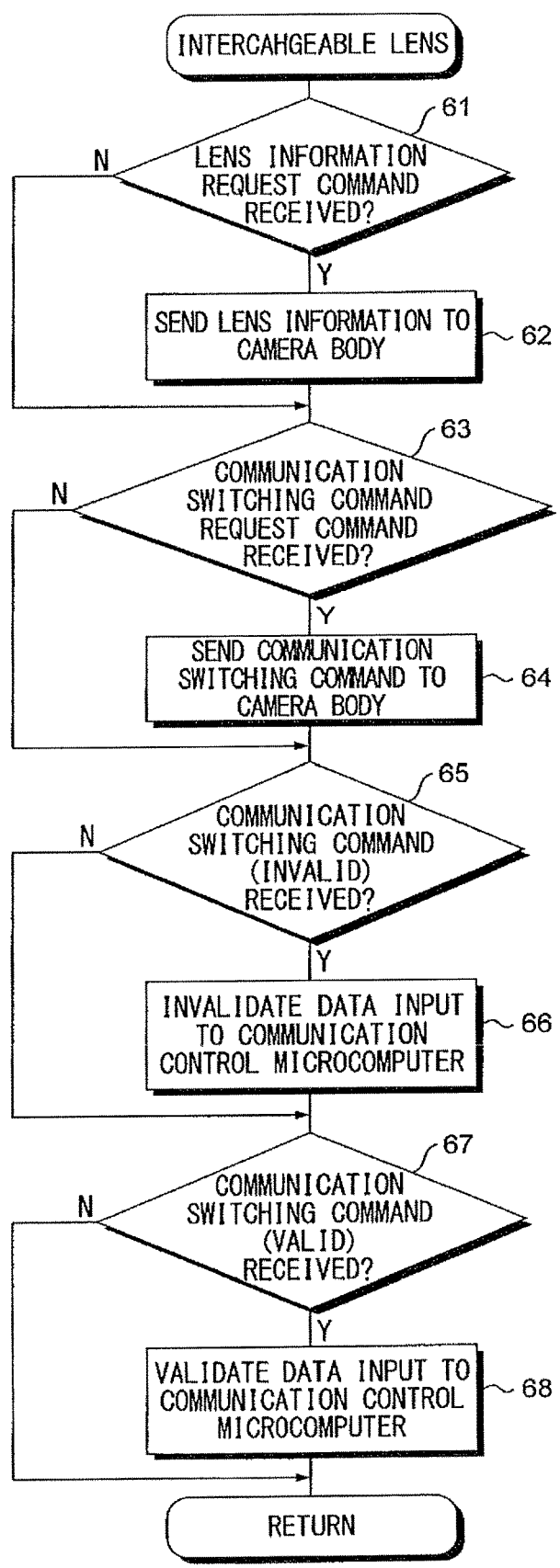
FIG. 11 is a flowchart illustrating processing executed by an interchangeable lens.

FIG. 10 is a flowchart illustrating processing executed by the camera body 1C, and FIG. 11 is a flowchart illustrating processing executed by the interchangeable lens 20C. This processing switches between direct control of the lens driving circuit 32 by camera body 1C and control via the communication control microcomputer 30.

A lens information request command is sent from the body-side microcomputer 2 of the camera body 1C to the communication control microcomputer 30 of the interchangeable lens 20C (step 41 in FIG. 10).

When the lens information request command sent from the body-side microcomputer 2 is received by the communication control microcomputer 30 of the interchangeable lens 20C ("YES" at step 61 in FIG. 11), lens information is read out of the memory 31. The read lens information is sent from the interchangeable lens 20C to the body-side microcomputer 2 (step 62 in FIG. 11). The lens information is information regarding the interchangeable lens 20C. For example, this includes information as to whether the lens is an interchangeable lens in which the lens driving circuit 32 can be controlled directly by the body-side microcomputer 2 incorporated in the camera body 1C.

Based upon the lens information sent from the interchangeable lens 20C, it is determined whether the lens driving circuit 32 can be controlled directly by the body-side microcomputer 2 (step 42 in FIG. 10). If direct control is possible ("YES" at step 42 in FIG. 10), a command requesting a switching command is sent to the interchangeable lens 20C (step 43 in FIG. 10).

When the command requesting a switching command sent from the body-side microcomputer 2 is received by the communication control microcomputer 30 of the interchangeable lens 20C ("YES" at step 63 in FIG. 11), a communication switching command is read from the command recording unit 33A. The read communication switching command is sent to the body-side microcomputer 2 by the communication control microcomputer 30 (step 64 in FIG. 11).

When a lens driving command is applied ("YES" at step 44 in FIG. 10), whether the lens driving circuit 32 of the interchangeable lens 20C mounted on the camera body 1C is directly controllable is determined in the camera body 1C (step 45 in FIG. 10).

If the lens driving circuit 32 can be controlled directly ("YES" at step 45 in FIG. 10), the communication control microcomputer 30 is sent a communication switching command (invalid) that invalidates input data (step 46 in FIG. 10).

When the communication switching command (invalid) sent from the body-side microcomputer 2 is received in the communication control microcomputer 30 ("YES" at step 65 in FIG. 11), the data input to the communication control microcomputer 30 is rendered invalid (step 66 in FIG. 11). As a result, even if a command for directly controlling the lens driving circuit 32 by the body-side microcomputer 2 is input to the communication control microcomputer 30, it is possible to prevent the lens driving circuit 32 from being controlled by the communication control microcomputer 30 owing to erroneous operation of the communication control microcomputer 30.

The body-side microcomputer 2 outputs the driving control signals and controls the lens driving circuit 32 directly (step 47 in FIG. 10). When direct control of the lens driving circuit 32 by the body-side microcomputer 2 ends, a communication command (valid) is sent from the body-side microcomputer 2 to the communication control microcomputer 30. The communication command (valid) is received by the communication control microcomputer 30 without being regarded as invalid ("YES" at step 67 in FIG. 11), whereby the communication control microcomputer 30 is switched so as to validate a command that is input subsequently (step 68 in FIG. 11). Since the body-side microcomputer 2 and the communication control microcomputer 30 can thus communicate, the camera body 1C is changed over to the lens communication mode (step 49 in FIG. 10).

If the body-side microcomputer 2 cannot directly control the interchangeable lens 20C mounted on the camera body 1C ("NO" at step 45 in FIG. 10), then a command is sent from the body-side microcomputer 2 to the communication control microcomputer 30 in such a manner that the lens driving circuit 32 is driven by the communication control microcomputer 30 (step 51 in FIG. 10).

The processing of steps 41 to 49 and the processing of step 51 is repeated until the camera body 1C is instructed to shut down its power supply (step 50 in FIG. 10).

Figure 12:
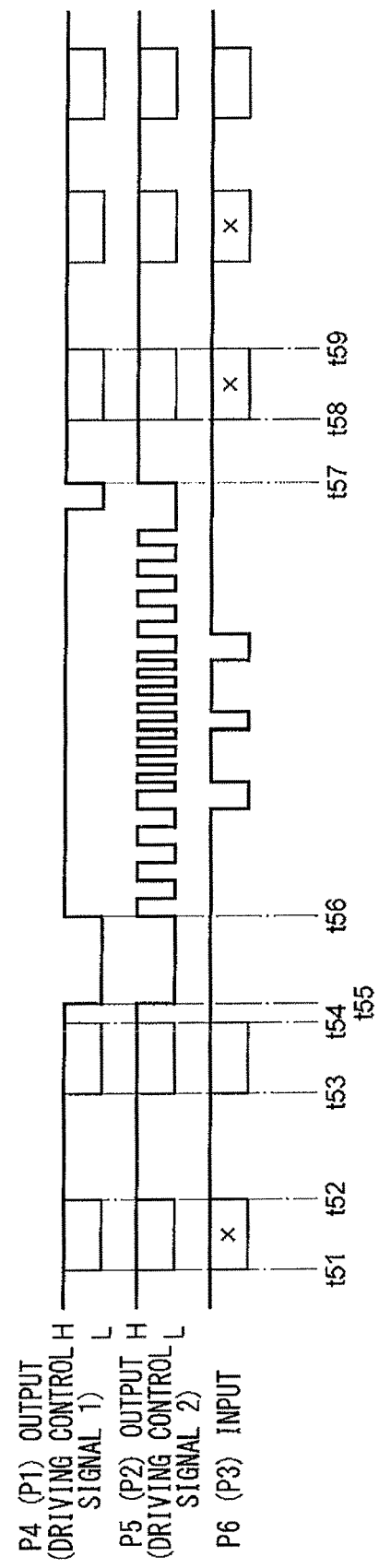
FIGS. 12 to 14 are time charts of a camera apparatus.

FIG. 12 is an example of output signals from ports P4 and P5 and of an input signal to port P6 of the body-side microcomputer 2 of the camera body 1C (or any of the other camera bodies) shown in FIG. 8.

From time t51 to time t52, serial clock pulses for communication are output to the communication control microcomputer 30 from the port P4 of the body-side microcomputer 2 and a lens status request command is output to the communication control microcomputer 30 from the port P5. When this is done, lens status data indicating the status of the interchangeable lens 20C is transmitted from the communication control microcomputer 30 of the interchangeable lens 20C from time t53 to time t54. The lens status data is input to the body-side microcomputer 2 from the port P6. Since the body-side microcomputer 2 can ascertain the status of the interchangeable lens 20C, it is capable of controlling the interchangeable lens taking the lens status into consideration. Further, from time t53 to time t54, serial clock pulses for communication are output to the communication control microcomputer 30 from the port P4 and the switching command (invalid) is output to the communication control microcomputer 30 from the port P5. When the switching command (invalid) is input to the communication control microcomputer 30, the communication control microcomputer 30 ignores input data other than a command which is a switching command (valid), as mentioned above.

Thereafter, from time t56 to time 57, commands for controlling the interchangeable lens 20C are output from the ports P4 and P5 of the body-side microcomputer 2. Although commands for controlling the interchangeable lens 20C are input to the communication control microcomputer 30 of the interchangeable lens 20C, they are invalidated before being input to the lens driving circuit 32. The lens driving motor 33 is controlled by the lens driving circuit 32.

Next, from time t58 to time t59, serial clock pulses for communication are again output to the communication control microcomputer 30 from the port P4 of the body-side microcomputer 2 and the switching command (valid) is output from the port P5. When the switching command (valid) is input to the communication control microcomputer 30, the communication control microcomputer 30 operates in accordance with the input data, as described above. Thereafter, communication takes place again between the body-side microcomputer 2 and the communication control microcomputer 30 or lens driving circuit 32.

In the example shown in FIG. 12, the ports P1 to P3 of the body-side microcomputer 2 are not utilized but these ports P1 to P3 can be utilized as well. In such case, the ports P4 to P6 would be utilized, as mentioned above, from time t51 to time t56 and, from time t56 to time t57, data that is output from the port P4 would be output from the port P1, data that is output from the port P5 would be output from the port P2, and data that enters from the port P3 would be utilized instead of data that enters from the port P6. From time t57 onward, the ports P1 to P3 are utilized again.

Figure 13:
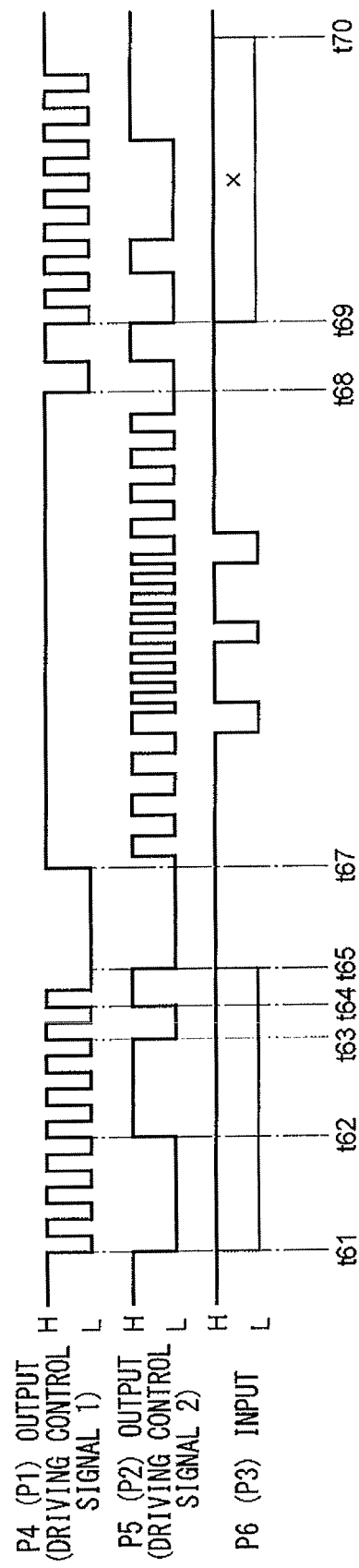

FIG. 13 is a modification of the processing shown in FIG. 12.

In the example shown in FIG. 13, it is arranged so that even if, from time t61 to time t62 which correspond to time t53 to time t54 described above, the switching command (invalid) that is input to the communication control microcomputer 30 enters the lens driving circuit 32 and the lens driving circuit 32 happens to operate owing to this switching command (invalid), the lens position will not change.

If, from time t61 to time t62, the clock pulses that are output from the port P4 and the switching command (invalid) that is output from the port P5 are input to the lens driving circuit 32 and the lens driving circuit 32 operates owing to these clock pulses and the like, then the lens driving motor 33 will rotate only three step positions in the forward direction. Thereafter, if, from time t62 to time t63, clock pulses that are output from the port P4 and the switching command (invalid) that is output from port P5 are input to the lens driving circuit 32 and the lens driving circuit 32 operates owing to these clock pulses and the like, then the lens driving motor 33 will rotate only three step positions in the reverse direction. Furthermore, if, from time t63 to time t64, clock pulses that are output from the port P4 and the switching command (invalid) that is output from the port P5 are input to the lens driving circuit 32 and the lens driving circuit 32 operates owing to these clock pulses and the like, then the lens driving motor 33 will rotate only one step position in the forward direction. Thereafter, if, from time t64 to time t65, clock pulses that are output from the port P4 and the switching command (invalid) that is output from the port P5 are input to the lens driving circuit 32 and the lens driving circuit 32 operates owing to these clock pulses and the like, the lens driving motor 33 will rotate only one step position in the reverse direction. Even if the lens driving circuit 32 operates erroneously in accordance with the switching command (invalid) that is input to the communication control microcomputer 30, the lens position will not change.

Thereafter, from time t67 to time t68, the lens driving circuit 32 is controlled based upon the output data from the body-side microcomputer 2. Further, with regard also to the switching command (valid) applied to the communication control microcomputer 30 from time t69 to time t70, the clock pulses that are output from the ports P1 and P2 of the body-side microcomputer 2 and the switching command (valid) are defined in such a manner that the lens position will not change even though the switching command (valid) is input to the lens driving circuit 32 and the lens driving circuit 32 operates based upon this switching command (valid), as described above.

Figure 14:
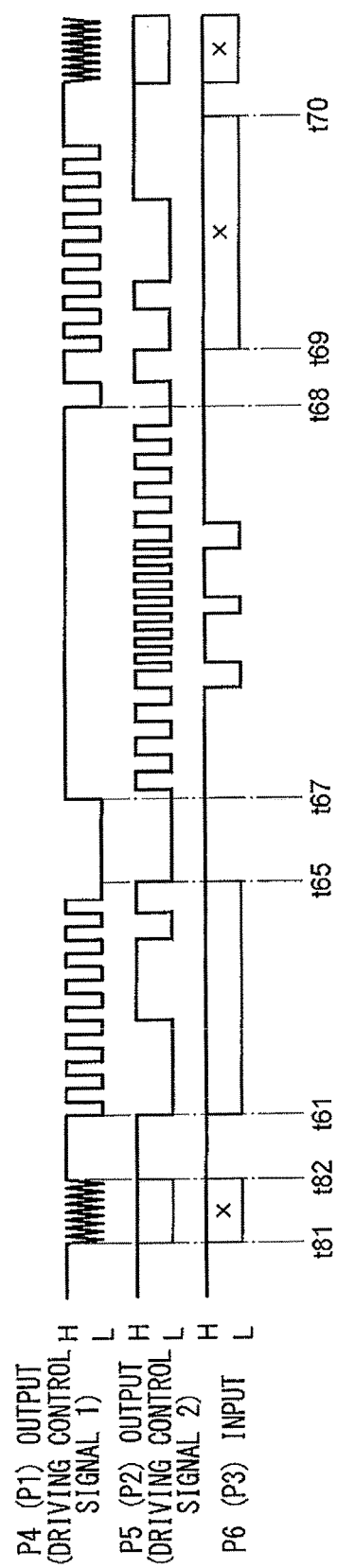

FIG. 14 is a further modification of the example shown in FIG. 13.

From time t81 to time t82 which correspond to time t51 to time t52 of FIG. 2, clock pulses that are output from the body-side microcomputer 2 are at high frequency. Even though these high-frequency clock pulses are input to the lens driving circuit 32, the lens driving circuit 32 cannot recognize these pulses (though it should be noted that there are occasions where the lens driving circuit 32 recognizes the pulses and operates erroneously). Consequently, control cannot be exercised, as described above with reference to FIG. 13, in such a manner that the lens position will not change even if the lens driving circuit 32 operates based upon the lens switching command (invalid or valid). In this embodiment, the clock pulses from time t61 to time t65 and from time t69 to time t70 over which the switching command (invalid or valid) is applied are changed over in frequency in such a manner that they can be recognized by the lens driving circuit 32. As a result, the lens position will not change even if the switching command (invalid or valid) is input to the lens driving circuit 32 and the lens driving circuit 32 happens to operate, as described above.

Figure 15:
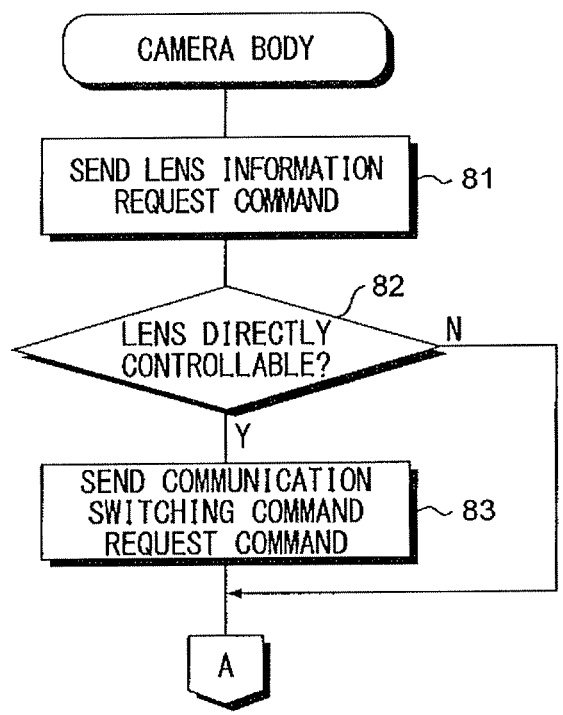
FIGS. 15 and 16 are flowcharts illustrating processing executed by a camera body.
Figure 16:
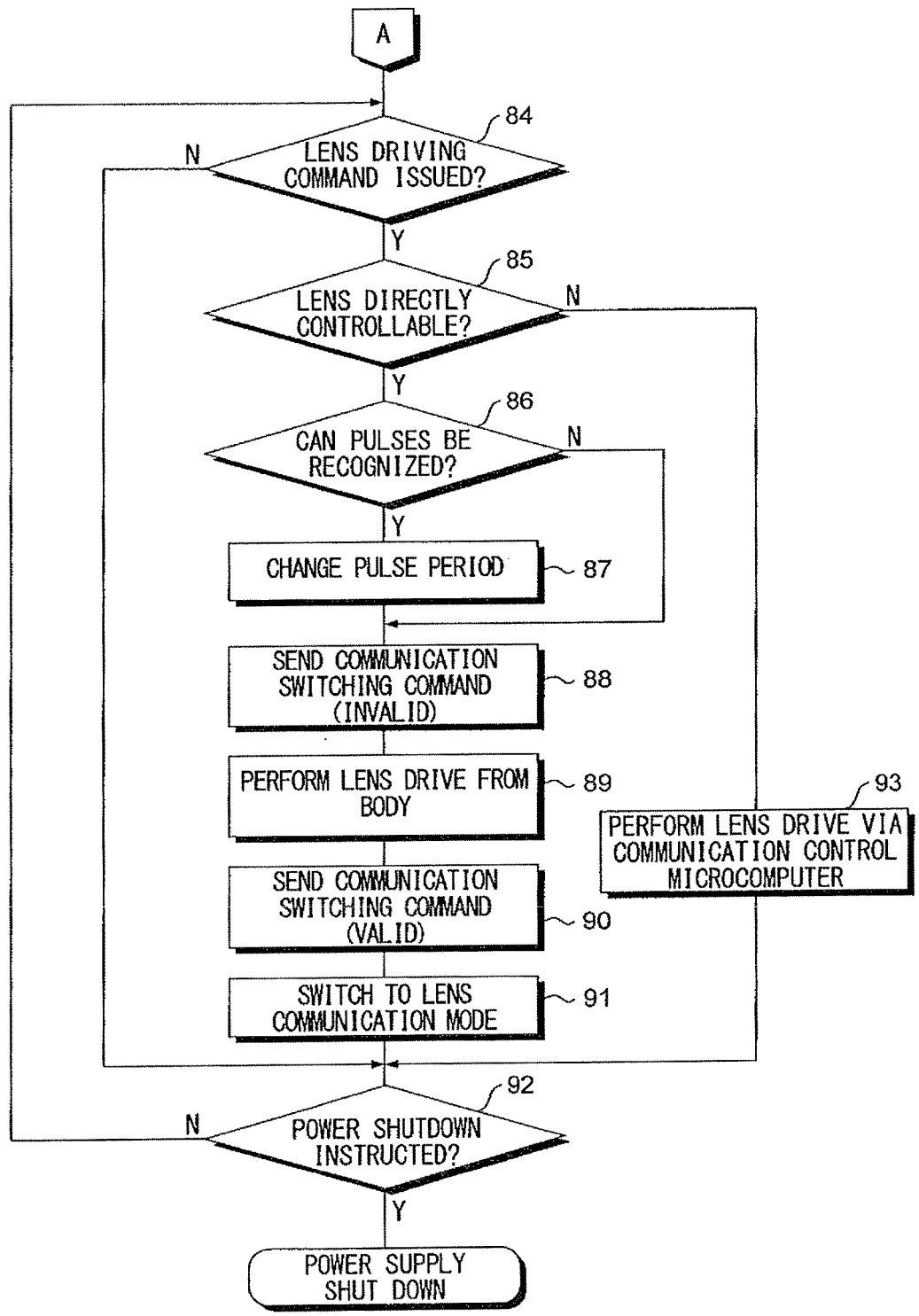

FIGS. 15 and 16, which corresponds to FIG. 10, are flowcharts illustrating processing executed by the camera body 1.

In a manner similar to that of the processing shown in FIG. 10, the lens information request command is transmitted from the body-side microcomputer 2 (step 81). If the interchangeable lens 20C can be controlled directly by the body-side microcomputer 2 ("YES" at step 82), a command requesting a communication switching command is transmitted (step 83). A switching command is sent from the interchangeable lens and is received by the body-side microcomputer 2. When the lens driving command is applied to the camera body 1 ("YES" at step 84), whether the interchangeable lens 20C mounted on the camera body 1C is directly controllable is determined (step 85).

If the interchangeable lens 20C cannot be controlled directly, then the communication control microcomputer 30 is operated by the command applied to the communication control microcomputer 30 from the body-side microcomputer 2 and the lens driving circuit 32 is controlled by the communication control microcomputer 30 (step 93). If the interchangeable lens can be controlled directly ("YES" at step 85), it is determined whether the clock pulses can be recognized by the lens driving circuit 32 (step 86). If the lens driving circuit 32 cannot recognize the clock pulses ("NO" at step 86), then the period of the clock pulses is changed in such a manner that they can be recognized by the lens driving circuit 32 (step 87). If the lens driving circuit 32 can recognize the clock pulses ("YES" at step 86), then the processing of step 87 is skipped.

Thereafter, as described above, the switching command (invalid) is sent to the interchangeable lens 20C (step 88) and the lens driving circuit 32 is controlled directly by the body-side microcomputer 2 (step 89). When the lens driving circuit 32 is controlled, the switching command (valid) is transmitted and the body-side microcomputer 2 can communicate with the communication control microcomputer 30. The processing from step 81 onward is repeated until shutdown of the power supply is instructed (step 92).

As many apparently widely different embodiments of the present invention can be made without departing from the spirit and scope thereof, it is to be understood that the invention is not limited to the specific embodiments thereof except as defined in the appended claims.

What is claimed is:

1. An interchangeable lens comprising:
an interchangeable lens communication control unit;
a lens driving circuit for driving a lens driving motor;
an interchangeable lens communication terminal electrically connected to a camera body communication terminal of a camera body by mounting the interchangeable lens on the camera body;
an interchangeable lens data communication line, which is connected directly between said interchangeable lens communication control unit and said interchangeable lens communication terminal, for performing data communication with the camera body; and
an interchangeable lens driving signal line, which is connected directly between said lens driving circuit and said interchangeable lens communication terminal, for transmitting a driving signal that drives the interchangeable lens;
wherein said interchangeable lens cannot be divided into an interchangeable lens part and an accessory.

* * * * *